United States Patent
Ito et al.

(10) Patent No.: US 9,386,646 B2
(45) Date of Patent: Jul. 5, 2016

(54) VEHICLE LAMP AND VEHICLE LAMP DRIVING DEVICE

(71) Applicant: KOITO MANUFACTURING CO., LTD., Tokyo (JP)

(72) Inventors: Masayasu Ito, Shizuoka (JP); Takao Muramatsu, Shizuoka (JP); Syouhei Yanagidu, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 14/657,476

(22) Filed: Mar. 13, 2015

(65) Prior Publication Data

US 2015/0264754 A1  Sep. 17, 2015

(30) Foreign Application Priority Data

Mar. 14, 2014  (JP) ................................. 2014-052540
Mar. 14, 2014  (JP) ................................. 2014-052541

(51) Int. Cl.
*H05B 33/08* (2006.01)
*H05B 41/282* (2006.01)

(52) U.S. Cl.
CPC .......... *H05B 33/083* (2013.01); *H05B 33/0815* (2013.01); *H05B 41/2828* (2013.01)

(58) Field of Classification Search
USPC ...................... 315/247, 224, 225, 185 S, 291, 315/307–326, 209 R
See application file for complete search history.

(56) References Cited

U.S. PATENT DOCUMENTS

| | | | | |
|---|---|---|---|---|
| 8,278,837 B1 * | 10/2012 | Lenk | ..................... | H05B 37/02 315/185 S |
| 2010/0109557 A1 * | 5/2010 | Bouchard | .......... | H05B 33/0818 315/294 |
| 2012/0139448 A1 * | 6/2012 | Chiang | ................ | H05B 33/083 315/307 |
| 2013/0313973 A1 * | 11/2013 | DeNicholas | ......... | H05B 33/089 315/122 |
| 2014/0361691 A1 * | 12/2014 | Nederbragt | .......... | H05B 33/083 315/122 |

FOREIGN PATENT DOCUMENTS

JP    2008-126958 A    6/2008

* cited by examiner

*Primary Examiner* — Tuyet Vo
(74) *Attorney, Agent, or Firm* — Sughrue Mion, PLLC

(57) ABSTRACT

There is provided a driving device which is used together with a light source including a plurality of light emitting units connected in series to configure a vehicle lamp. The driving device includes a current source which is configure to supply a drive current to the light source, and N bypass circuits which are provided in parallel to N light emitting units, respectively. Each of the bypass circuits includes a bypass transistor which is provided in parallel to a corresponding light emitting unit, a feedback capacitor which is provided between a gate and a drain of the bypass transistor, and a gate drive circuit which is configured to supply a drive voltage between the gate and a source of the bypass transistor according to a control signal.

15 Claims, 8 Drawing Sheets

500

40a

US 9,386,646 B2

VEHICLE LAMP AND VEHICLE LAMP DRIVING DEVICE

CROSS-REFERENCE TO RELATED APPLICATIONS

The present application claims the benefit of priority of Japanese Patent Application Nos. 2014-052540 and 2014-052541, both filed on Mar. 14, 2014, the content of which is incorporated herein by reference.

TECHNICAL FIELD

The present invention relates to a vehicle lamp used for an automobile or the like.

BACKGROUND

In general, a vehicle lamp can switch between a low beam and a high beam. The low beam is for illuminating a near area with a predetermined illumination intensity, and there are regulations on light distribution so as not to give glare to oncoming vehicles or preceding vehicles. The low beam is used mainly when the vehicle runs in an urban area. Meanwhile, the high beam is for illuminating a front wide range and a distant area with a comparatively high illumination intensity. The high beam is used mainly when the vehicle runs on a road where there are few oncoming vehicles and preceding vehicles. That is, although the high beam is superior to the low beam in visibility for drivers, the high beam has a problem that the high beam gives glare to walkers or drivers of vehicles existing in front thereof.

Recently, an adaptive driving beam (ADB) technology has been proposed for dynamically and adaptively controlling the light distribution pattern of a high beam based on the surrounding situation of the vehicle. The ADB technology is for detecting whether there is a preceding vehicle, an oncoming vehicle or a walker in front thereof, and suppressing glare to be given to those vehicles and walkers, for example, by reducing light to be radiated toward areas corresponding to the vehicles and walkers.

A vehicle lamp having an ADB function will be described. FIG. 1 is a block diagram illustrating a vehicle lamp having an ADB function according to a comparative art. It is noted that that this comparative art should not be considered as a prior art.

A vehicle lamp 1r includes a light source 10 and a driving device 20r. In an ADB, a high beam irradiation area is divided into N sub-areas (wherein N is a natural number). The light source 10 includes a plurality of light emitting units 12_1 to 12_N which are associated with the N sub-areas, respectively. Each light emitting unit 12 includes a semiconductor device such as a light emitting diode (LED) or a laser diode (LD), and is disposed so as to irradiate a corresponding sub-area. Each light emitting unit 12 may be a single device, or may include a plurality of devices connected in series.

The driving device 20r controls the plurality of light emitting units 12_1 to 12_N such that the respective light emitting units are turned on or off, thereby changing the light distribution of a high beam. Alternatively, the driving device 20r performs pulse width modulation (PWM) control on the light emitting units 12 at a high frequency, thereby adjusting effective luminance.

The driving device 20r includes a current source 30, a plurality of bypass circuits 40_1 to 40_N, and a controller 50. The current source 30 receives a battery voltage $V_{BAT}$ (also referred to as input voltage $V_{IN}$) from a battery 2 through a switch 4, and stabilizes a drive current $I_{DRV}$ to flow in the light source 10, at a target amount.

The plurality of bypass circuits 40_1 to 40_N are associated with the plurality of light emitting units 12_1 to 12_N, respectively. Each bypass circuit 40 is configured to be switchable between an ON state and an OFF state. If an i-th bypass circuit 40_i becomes the ON state, the drive current $I_{DRV}$ flows in the bypass circuit 40_i, not in the light emitting unit 12_i, thereby turning off the light emitting unit 12_i. Meanwhile, if the bypass circuit 40_i becomes the OFF state, the drive current $I_{DRV}$ flows in the light emitting unit 12_i, thereby turning on the light emitting unit 12_i.

An upstream processor 6 (for example, an electronic control unit (ECU)) for controlling the vehicle lamp 1r determines sub-areas to be irradiated by the high beam based on the situation of the front of the vehicle. Then, the processor 6 issues a control command to the controller 50 of the driving device 20r. The controller 50 controls the states of the bypass circuits 40_1 to 40_N based on the control command from the processor 6. Specifically, the controller 50 selects light emitting units 12 corresponding to the sub-areas to be irradiated, and turns off bypass circuits 40 parallel to the selected light emitting units 12 while turning on bypass circuits 40 parallel to the other light emitting units 12.

If a bypass circuit 40 is suddenly switched from the ON state to the OFF state, an output voltage $V_{OUT}$ of the current source 30 decreases. In a case where the current source 30 is configured by the topology of a back converter, a boost converter, a flyback converter, a forward converter or the like having a high-capacity smoothing capacitor to be connected in parallel to a load, if the output voltage $V_{OUT}$ suddenly decreases, electric charge accumulated in the smoothing capacitor is released, whereby the drive current $I_{DRV}$ flowing on the light emitting unit 12 side overshoots. On the contrary, if a bypass circuit 40 is suddenly switched from the OFF state to the ON state, the drive current $I_{DRV}$ undershoots. If the width of fluctuation of the drive current $I_{DRV}$ followed by turning on or off of a bypass circuit 40 is large, the reliability of the light emitting unit 12 is adversely affected, or a noise component increases. Particularly, in a case where a plurality of bypass circuits 40 are turned on or off at the same time, the width of fluctuation of the output voltage $V_{OUT}$ increases, and this problem becomes more remarkable. In order to solve this problem, there has been proposed a technology for gradually switching the bypass circuits 40 between the ON state and the OFF state (see JP-A-2008-126958).

SUMMARY

FIG. 2 is a circuit diagram illustrating a bypass circuit 40r examined by the inventors of the present invention. Similarly to JP-A-2008-126958, the bypass circuit 40r includes a bypass transistor M1 which is provided in parallel to a light emitting unit 12, and a lowpass filter (an integration circuit) 42 which filters a control signal for instructing to turn on or off the bypass transistor M1 and supplies the filtered control signal to the gate of the bypass transistor M1. In the front stage of the lowpass filter 42, a level shift circuit 44 is provided.

The lowpass filter 42 is provided for making the gate voltage of the bypass transistor M1 change gradually, thereby gradually switching the bypass transistor M1 between the ON state and the OFF state.

The inventors of the present invention examined the bypass circuit 40r of FIG. 2 including a shunt capacitor provided between the gate and the source of the bypass transistor M1 and came to recognize the following phenomenon.

FIG. 3 is a waveform chart illustrating the operation of the vehicle lamp 1r having the bypass circuit 40r of FIG. 2.

When a control signal S1 is at a high level, a transistor Q1 of the level shift circuit 44 is in an ON state, and a voltage $V_{GS}$ between the gate and the source of the bypass transistor M1 becomes 0, whereby the bypass transistor M1 turned off. In the meanwhile, a current $I_{LED}$ flowing in the light emitting unit 12 becomes the drive current $I_{DRV}$ which is generated by the current source 30, whereby the light emitting unit 12 is turned on.

If the control signal S1 transitions to a low level at a time t0, the transistor Q1 of the level shift circuit 44 is turned on, and the voltage $V_{GS}$ between the gate and the source of the bypass transistor M1 rises according to the time constant of the lowpass filter 42. Thereafter, if the voltage $V_{GS}$ between the gate and the source exceeds a threshold voltage $V_{TH}$ for a voltage between the gate and the source of the MOSFET, the bypass transistor M1 is turned on, whereby the drive current $I_{DRV}$ is drawn into the bypass transistor M1, and the current $I_{LED}$ flowing in the light emitting unit 12 decreases.

Here, before a time t1, since the bypass transistor M1 is in the OFF state, the voltage between the drain and the source of the bypass transistor M1 is equal to the forward voltage Vf of the light emitting unit 12, and thus is about 3 V to 10 V. In this state, even if the voltage $V_{GS}$ between the gate and the source of the bypass transistor M1 is gradually changed, it may be not possible to gradually change the current flowing in the bypass transistor M1, and thus it may be not possible to gradually change the current $I_{LED}$ flowing in the light emitting unit 12. In this configuration, in order to more gradually change the current $I_{LED}$, it may be necessary to set the cut-off frequency of the lowpass filter 42 to be lower (i.e. to set the time constant to be longer). However, in this case, a delay time τ from when the control signal S1 transitions to when the LED current $I_{LED}$ starts to change becomes longer.

In addition, since the smoothing capacitor has large capacitance, in order to suppress an increase in the drive current $I_{DRV}$ due to control on turning on or off of the bypass circuit 40, it may be necessary to set a turning-on tune and a turning-off time (hereinafter, referred to generally as transition times) to be considerably long. On the other hand, if the transition times are set to be excessively long, a switching loss increases and thus efficiency decreases. Also, in a case of using the bypass circuit 40 to perform PWM dimming, if a duty ratio is small, the accuracy of the dimming decreases due to influence of the transition times.

These problems occur not only in a case of performing ADB control but also in other cases such as a case of using the vehicle lamp 1r shown in FIG. 1 to control luminance.

Accordingly, an aspect of the present invention provides a vehicle lamp capable of gradually changing a current flowing in a light emitting unit, and a vehicle lamp driving device. Another aspect of the present invention provides a vehicle lamp capable of suppressing variation of a drive current, and a vehicle lamp driving device.

According to an illustrative embodiment of the present invention, there is provided a driving device which is used together with a light source including a plurality of light emitting units connected in series to configure a vehicle lamp. The driving device includes: a current source which is configure to supply a drive current to the light source; and N bypass circuits which are associated with N light emitting units of the plurality of light emitting units and provided in parallel to the N light emitting units, respectively, and which are configured to be independently switchable between an ON state and an OFF state, where N is a natural number. Each of the bypass circuits includes: a bypass transistor which is provided in parallel to a corresponding light emitting unit; a feedback capacitor which is provided between a gate and a drain of the bypass transistor or between a gate and a collector of the bypass transistor; and a gate drive circuit which is configured to supply a drive voltage between the gate and a source of the bypass transistor or between the gate and an emitter of the bypass transistor, according to a control signal.

According to the above configuration, the feedback capacitor is provided between the gate and the drain of the bypass transistor or between the gate and collector of the bypass transistor. Therefore, due to a mirror effect, in a mirror section, the voltage $V_{GS}$ between the gate and the source or between the gate and the emitter becomes flat in the vicinity of the threshold voltage $V_{TH}$, and changes at a small slope. Therefore, it is possible to gradually switch the bypass transistor between the ON state and the OFF state, and it is possible to gradually change the current flowing in the light emitting unit.

In the above driving device, the gate drive circuit may be configured such that a time constant of charging and a time constant of discharging for a gate capacitance of the bypass transistor and the feedback capacitor are substantially same. In this case, it is possible to match current slopes during turning on and turning off of the bypass transistor.

In the above driving device, the gate drive circuit may include a clamp element which is configured to limit a voltage between the gate and the source of the bypass transistor or between the gate and the emitter of the bypass transistor such that the voltage does not exceed a predetermined clamp voltage. The clamp voltage may be 1.5 times to 3 times of a threshold voltage of the bypass transistor. In this case, it is possible to match turning-on times and turning-off times.

In the above driving device, the gate drive circuit may include: a level shift circuit which is configured to receive the control signal and generate a drive voltage such that the drive voltage transitions between a high-level voltage $V_H$ and 0 V; a current limiting resistor which includes one end connected to the gate of the bypass transistor and another end connected to an output terminal of the level shift circuit; and a diode which is provided in parallel to the current limiting resistor such that an anode of the diode is positioned on a gate side of the bypass transistor.

In this case, the level shift circuit may include: an input transistor which is configured to be turned on or off according to the control signal; and a voltage dividing resistor pair which includes two resistors connected in series and is configured to divide a voltage of one end of the input transistor.

Alternatively, the level shift circuit may include: a constant current source which is configured to be turned on or off according to the control signal; and a resistor which is configured to make conversion between current and voltage and is provided on a path for flowing a current which is generated by the constant current source.

According to another illustrative embodiment of the present invention, there is provided a driving device which is used together with a light source including a plurality of light emitting units connected in series to configure a vehicle lamp. The driving device includes: a converter which is configured to supply a drive current to the light source; N bypass circuits which are associated with N light emitting units of the plurality of light emitting units and provided in parallel to the N light emitting units, respectively, and which are configured to be independently switchable between an ON state and an OFF state, where N is a natural number; and a controller which is configured to control the converter such that the drive current approaches a predetermined target value $I_{REF}$ and control turning on and off of the N bypass circuits. The converter includes: a primary side circuit which includes a switching transistor, and a first inductor configured to accumulate energy at switching of the switching transistor; a secondary side circuit which includes a second inductor; and a coupling capacitor which includes capacitance C and is configured to couple the primary side circuit and the secondary side circuit. A transition time $T_{TRN}$ which is required to turn on or off the bypass circuit satisfies the following expression (1):

$$\Delta V \times C < I_{REF} \times T_{TRN} \qquad (1)$$

where $\Delta V$ is a difference of an output voltage of the converter between before and after the bypass circuit is turn on or off.

Since the converter is configured by a topology having a coupling capacitor, a high-capacity smoothing capacitor becomes unnecessary. Therefore, as compared to a topology having a high-capacity smoothing capacitor, it is possible to considerably reduce the transition times. Further, since the transition time $T_{TRN}$ is determined so as to satisfy Expression (1), a current for changing the output voltage $V_{OUT}$ by $\Delta V$ can flow in the bypass circuit side. Therefore, it is possible to suppress the drive current from overshooting or undershooting.

In the above driving device, the following expression (2) may be satisfied:

$$I_{REF} \times \Delta V \times T_{SW}^2 / T_{TRN} < L \times (I_{MAX}^2 - I_{REF}^2)/2 \qquad (2)$$

where L is an inductance of the second inductor, $I_{MAX}$ is a rated maximum current of the light emitting units, and $T_{SW}$ is a switching cycle of the switching transistor.

In a case of focusing on the switching cycle of the switching transistor of the converter, the current flowing in the second inductor has a ripple component of the switching cycle. In a case where the driving device is configured so as to satisfy Expression (2), it is possible to restrict the maximum value of the current ripple so as to be smaller than the rated maximum current of the light emitting unit, and it is possible to improve the reliability of the circuit.

According to a further illustrative embodiment of the present invention, there is provided a driving device which is used together with a light source including a plurality of light emitting units connected in series to configure a vehicle lamp. The driving device includes: a converter which is configured to supply a drive current to the light source; N bypass circuits which are associated with N light emitting units of the plurality of light emitting units and provided in parallel to the N light emitting units, respectively, and which are configured to be independently switchable between an ON state and an OFF state, where N is a natural number; and a controller which is configured to control the converter such that the drive current approaches a predetermined target value $I_{REF}$ and control turning on and off of the N bypass circuits. The converter includes: a primary side circuit which includes a switching transistor, and a first inductor configured to accumulate energy at switching of the switching transistor; a secondary side circuit which includes a second inductor having an inductance L; and a coupling capacitor which is configured to couple the primary side circuit and the secondary side circuit. The following expression (2) is satisfied:

$$I_{REF} \times \Delta V \times T_{SW}^2 / T_{TRN} < L \times (I_{MAX}^2 - I_{REF}^2)/2 \qquad (2)$$

where $T_{TRN}$ is a transition time which is required to turn on or off the bypass circuit, $\Delta V$ is a difference of an output voltage of the converter between before and after the bypass circuit is turn on or off, $I_{MAX}$ is a rated maximum current of the light emitting units, and $T_{SW}$ is a switching cycle of the switching transistor.

In a case of focusing on the switching cycle of the switching transistor of the converter, the current flowing in the second inductor has a ripple component of the switching cycle. In a case where the driving device is configured so as to satisfy Expression (2), it is possible to restrict the maximum value of the current ripple so as to be smaller than the rated maximum current of the light emitting unit, and it is possible to improve the reliability of the circuit.

In the above driving device, the first inductor may include a first magnetic element or may be a transformer. The second inductor may include a second magnetic element or may be a transformer.

In the above driving device, each of the bypass circuits may include: a bypass transistor which is provided in parallel to a corresponding light emitting unit; a feedback capacitor which is provided between a gate and a drain of the bypass transistor or between a gate and a collector of the bypass transistor; and a gate drive circuit which is configured to supply a drive voltage between the gate and a source of the bypass transistor or between the gate and an emitter of the bypass transistor, according to a control signal.

According to a still further illustrative embodiment, there is provided a vehicle lamp including a light source which includes a plurality of light emitting units connected in series, and the driving device of any one of the above described illustrative embodiment which is configured to drive the light source.

According to the above configuration, it is possible to gradually change the current of each light emitting unit. Also, it is possible to suppress variation of the drive current.

BRIEF DESCRIPTION OF THE DRAWINGS

The above and other aspects of the present invention will become more apparent and more readily appreciated from the following description of illustrative embodiments of the present invention taken in conjunction with the attached drawings, in which.

DETAILED DESCRIPTION

Hereinafter, illustrative embodiments of the present invention will be described with reference to the accompanying drawings. Throughout the drawings, identical or equivalent components, members, and processes are denoted by the same reference symbols, and will not be repeatedly described. Also, those illustrative embodiments do not limit the invention and are illustrative, and all features to be described in the illustrative embodiments, and combinations thereof may not be essential features of the invention.

In this specification, a state where a member A is connected to a member B includes not only a case where the member A and the member B are physically and directly connected, but also a case where the member A and the member B are indirectly connected through another member which does not substantially influence the electric connection state of the member A and the member B, or does not damage functions and effects which are accomplished by coupling of the member A and the member B.

Similarly, a state where a member C is provided between the member A and the member B includes not only a case where the member A and the member C, or the member B and the member C are directly connected, but also a case where the member A and the member C, or the member B and the member C are indirectly connected through another member which does not substantially influence the electric connection state of the member A and the member C, or the member B and the member C, or does not damage functions and effects which are accomplished by coupling of the member A and the member C, or the member B and the member C.

Also, in this specification, reference symbols denoting electric signals such as a voltage signal or a current signal, or circuit elements such as a resistor or a capacitor represent a voltage value, a current value, a resistance value, or a capacitance value, if necessary.

First Illustrative Embodiment

Figure 4:
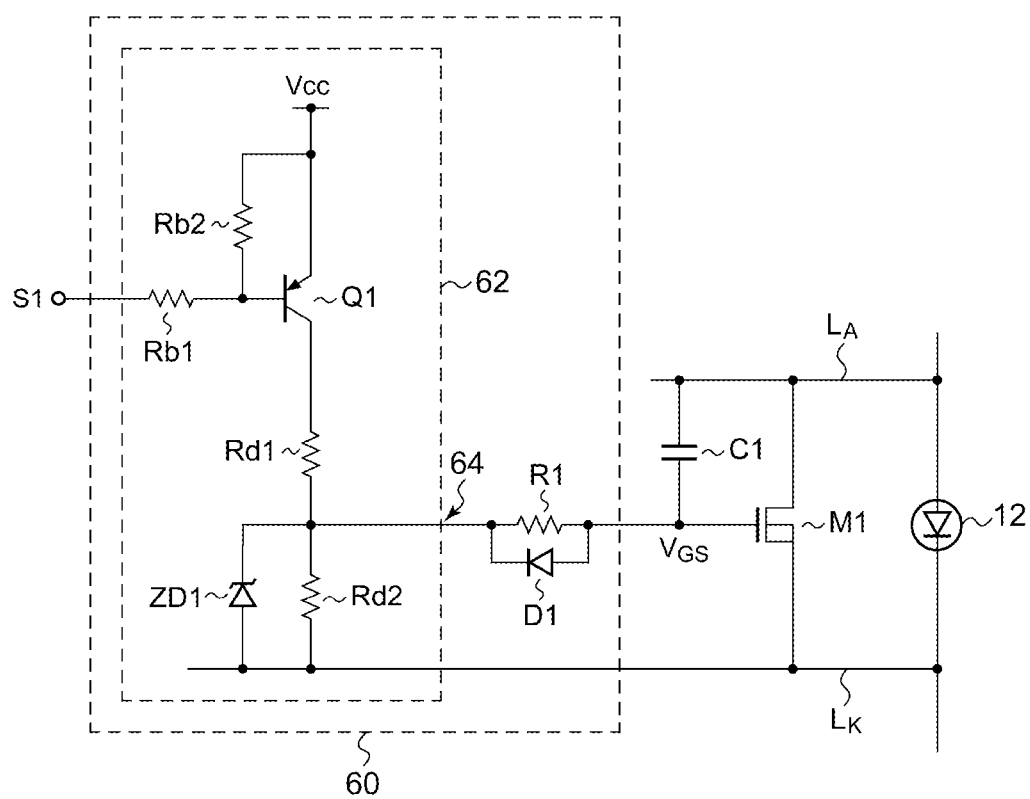
FIG. 4 is a circuit diagram illustrating a bypass circuit according to a first illustrative embodiment.

FIG. 4 is a circuit diagram illustrating a bypass circuit 40 according to a first illustrative embodiment. The bypass circuit 40 is used in a driving device 20 of FIG. 1. The configuration of a peripheral circuit of the bypass circuit 40 will be described briefly with reference to FIG. 1.

A vehicle lamp 1 includes a light source 10 and a driving device 20. The light source 10 includes a plurality of light emitting units 12_1 to 12_N connected in series. The driving device 20 includes a current source 30, N bypass circuits 40_1 to 40_N (N is a natural number), and a controller 50.

The current source 30 supplies a drive current $I_{DRV}$ to the light source according to target luminance. For example, the current source 30 includes a step-up type or step-down type converter, and a control circuit for the converter. The control circuit may detect the drive current $I_{DRV}$ and perform feedback control on the switching state of the converter such that the detected drive current $I_{DRV}$ approaches a target amount. The type of the converter and the current control method are not especially limited, and may use other known technologies.

The N bypass circuits 40_1 to 40_N are associated with N light emitting units 12 of the plurality of light emitting units 12 and provided in parallel to the light emitting units 12, respectively. The bypass circuit 40_i is configured to switch between an ON state and an OFF state in response to a control signal S1_i, and forms a bypass parallel to the light emitting unit 12_i when the bypass circuit 40_i is in the ON state.

In a normal lighting control period, according to respective instructions for turning on or off the N light emitting units 12_1 to 12_N, the controller 50 controls turning on or off of each of the N bypass circuits 40_1 to 40_N. More specifically, the controller 50 performs PWM on the control signal S1_i according to the target luminance of the light emitting unit 12_i, so as to switch the bypass circuit 40_i in a PWM cycle, thereby dimming the light emitting unit 12_i.

The configuration of a bypass circuit 40 will be described with reference to FIG. 4.

The bypass circuit 40 includes a bypass transistor M1, a feedback capacitor C1, and a gate drive circuit 60. The bypass transistor M1 is provided in parallel to the light emitting unit 12. A line which is connected to the cathode of the light emitting unit 12 is referred to as a cathode line $L_K$, and a line which is connected to the anode of the light emitting unit 12 is referred to as an anode line $L_A$. The cathode line of the i-th bypass circuit 40 is common to the (i+1)-th bypass circuit 40.

The bypass transistor M1 is a metal oxide semiconductor field effect transistor (MOSFET), and the source of the bypass transistor M1 is connected to the cathode line $L_K$, and the drain of the bypass transistor M1 is connected to the anode line $L_A$. Instead of the MOSFET, an insulated gate bipolar transistor (IGBT) may be used. In this case, the term "source" can be replaced by the term "emitter", and the term "drain" can be replaced by the term "collector".

The feedback capacitor C1 is provided between the gate and the drain of the bypass transistor M1. The capacitance of the feedback capacitor C1 is determined to provide a sufficient mirror effect to the bypass transistor M1. In general, the capacitance between the gate and the drain decreases responsiveness of the MOSFET, and thus is avoided. However, as will be described below, in the first illustrative embodiment, the mirror effect is intentionally used. The feedback capacitor C1 may preferably have the capacitance value of about several hundreds pF to 1000 pF.

The gate drive circuit 60 supplies a drive voltage $V_{Gs}$ between the gate and the source of the bypass transistor M1 according to the control signal S1.

In the first illustrative embodiment, the high level of the control signal S1 is associated with turning on of the light emitting unit 12, and the low level is associated with turning off of the light emitting unit 12. Therefore, when the control signal S1 is at the high level, the gate drive circuit 60 makes the drive voltage $V_{GS}$ between the gate and the source become 0, thereby turning off the bypass transistor M1. Meanwhile, when the control signal S1 is at the low level, the gate drive circuit 60 makes the drive voltage $V_{GS}$ between the gate and the source become a high-level voltage $V_H$ higher than the threshold voltage $V_{TH}$, thereby turning on the bypass transistor M1.

The gate drive circuit 60 includes a level shift circuit 62, a current limiting resistor R1, and a diode D1. The level shift circuit 62 inverts the logic level of the control signal S1, thereby performing level shift to the high-level voltage $V_H$ and 0 V. The current limiting resistor R1 is provided between an output terminal 64 of the level shift circuit 62 and the gate of the bypass transistor M1, and limits a current for charging the gate capacitance of the bypass transistor M1. The diode D1 is provided in parallel to the current limiting resistor R1 such that the anode is positioned on the gate side of the bypass transistor M1.

The level shift circuit 62 includes base resistors Rb1 and Rb2, an input transistor Q1, voltage dividing resistors Rd1 and Rd2, and a Zener diode ZD1.

The input transistor Q1 is a PNP type bipolar transistor, and the base of the input transistor Q1 receives the control signal S1 through the base resistor Rb1. The base resistor Rb2 is provided between the base and the emitter of the input transistor Q1. The base resistors Rb1 and Rb2 cause the control signal S1 and a power supply voltage $V_{CC}$ to be divided and input to the base of the input transistor Q1.

The voltage dividing resistors Rd1 and Rd2 divide the collector voltage of the input transistor Q1, thereby generating the drive voltage $V_{GS}$ at the output terminal 64. If the on-resistance of the input transistor Q1 is set to be sufficiently small, the high-level voltage $V_H$ of the drive voltage $V_{GS}$ is given by Expression (11).

$$V_H = (V_{CC} - V_K) \times Rd2/(Rd1 + Rd2) \quad (11)$$

$V_K$ represents the potential of the cathode line $L_K$.

The Zener diode ZD1 is provided between the output terminal 64 and the cathode line $L_K$ and functions as a clamp element which limits the drive voltage $V_{GS}$ such that the drive voltage $V_{GS}$ does not exceed a predetermined clamp voltage $V_{CL}$. That is, the high-level voltage $V_H$ becomes a lower one of the voltage given by Expression (11) and the clamp voltage $V_{CL}$.

A turning-on time of the bypass transistor M1 corresponds to a time which is required for the voltage $V_{GS}$ between the gate and the source to rise from 0 V to the threshold voltage $V_{TH}$, and a turning-off time of the bypass transistor M1 corresponds to a time which is required for the voltage $V_{GS}$ between the gate and the source to fall from the high-level voltage $V_H$ to the threshold voltage $V_{TH}$. In order to match the turning-on time and the turning-off time, it may be necessary that a difference ($V_H - V_{TH}$) and the threshold voltage $V_{TH}$ have the same level (0.5 times to 2 times). That is, it may be preferable to set the high-level voltage $V_H$, in other words, the clamp voltage $V_{CL}$ to 1.5 times to 3 times the threshold voltage $V_{TH}$.

Figure 1:
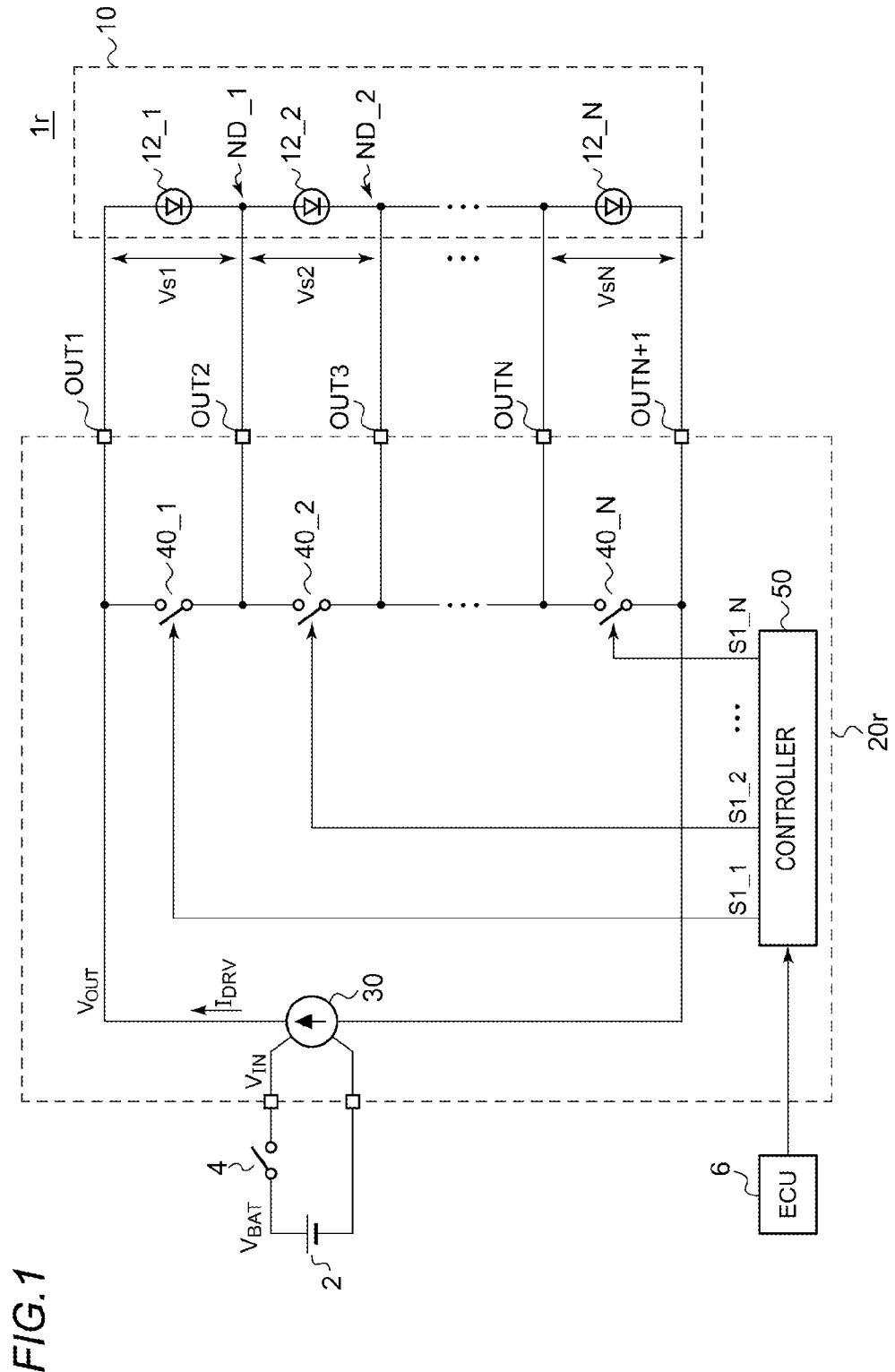
FIG. 1 is a block diagram illustrating a vehicle lamp having an ADB function according to a comparative art.

Also, it may be preferable to determine the power supply voltage $V_{CC}$ of the level shift circuit 62 according to the configuration of the driving device 20. For example, in an application in which the current source 30 of FIG. 1 is a converter for generating a negative voltage, and the voltage at a node OUTN+1 is negative, it may be preferable to set the power supply voltage $V_{CC}$ to 5 V to 10 V.

In an application in which the current source 30 is a step-up converter and a voltage stepped up is applied to a node OUT1, the power supply voltage $V_{CC}$ may be the voltage stepped up.

In order for the gate drive voltage $V_{GS}$ to transition between the high-level voltage $V_H$ and 0 V, it may be necessary to charge and discharge the gate capacitance (not shown) of the bypass transistor M1 and the feedback capacitor C1. It may be preferable that the gate drive circuit 60 be configured such that a time constant for charging the combined capacitance of the gate capacitance and the feedback capacitor is substantially the same as a time constant for discharging the combined capacitance. In the gate drive circuit 60 of FIG. 4, a path including the voltage dividing resistor Rd1 and the current limiting resistor R1 becomes a charging path, and a path including the diode D1 and the voltage dividing resistor Rd2 becomes a discharging path. Therefore, the values of the resistors may be determined so as to satisfy the Expression: $Rd1 + R1 \approx Z_{D1} + Rd2$. Here, $Z_{D1}$ represents the forward impedance of the diode D1.

In the above, the configuration of the bypass circuit 40 has been described. Subsequently, the operation of the bypass circuit 40 will be described.

Figure 2:
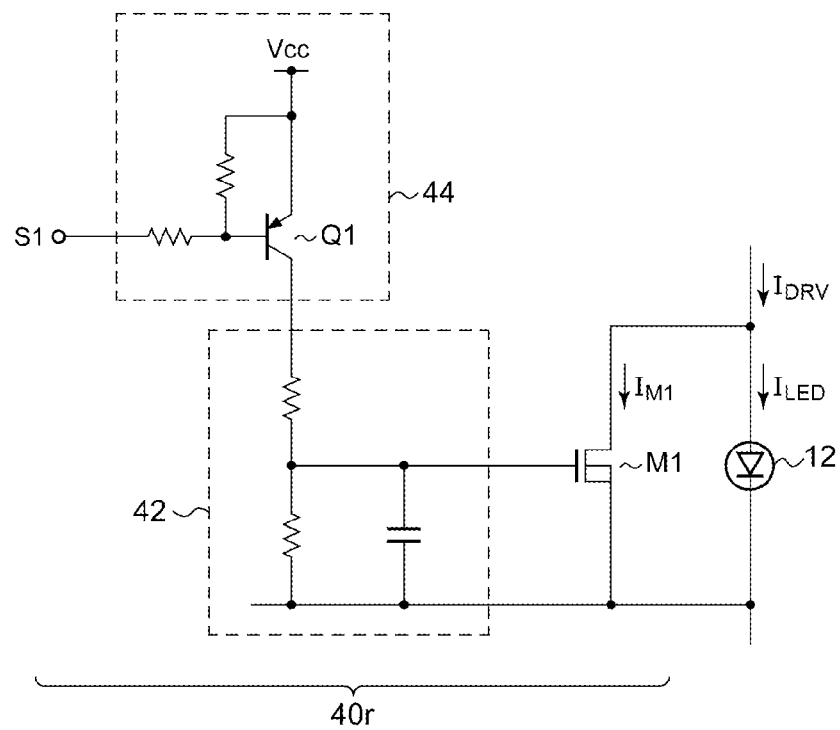
FIG. 2 is a circuit diagram illustrating a bypass circuit examined by the inventors of the present invention.
Figure 5:
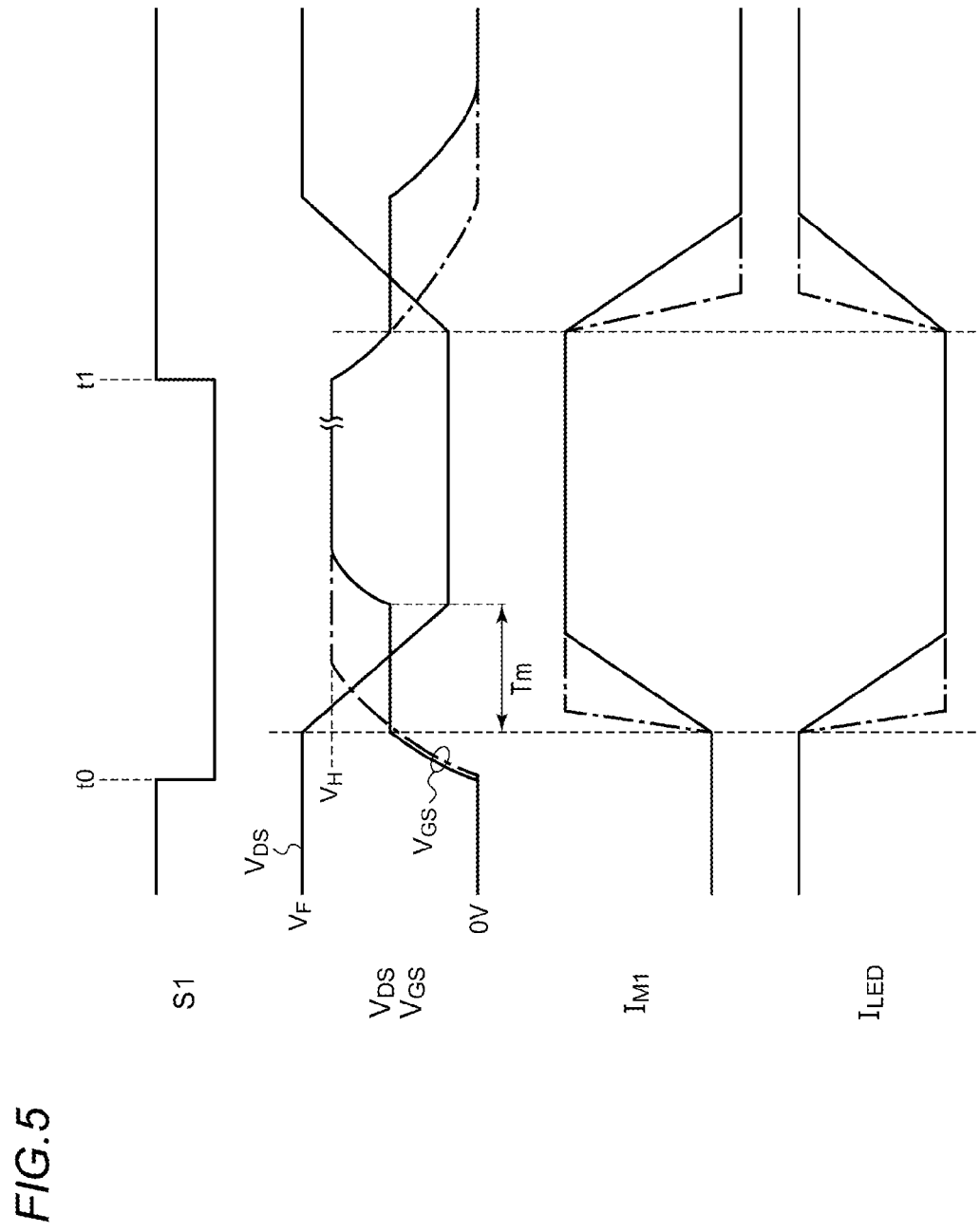
FIG. 5 is a waveform chart illustrating an operation of the bypass circuit of FIG. 4.

FIG. 5 is a waveform chart illustrating the operation of the bypass circuit 40 of FIG. 4. For comparison, the waveform of the operation of the bypass circuit 40r of FIG. 2 is shown by an alternate long and short dash line.

If the control signal S1 transitions to the low level at a time t0, the input transistor Q1 is turned on, and the gate voltage $V_{GS}$ starts to rise. Thereafter, if the gate voltage $V_{GS}$ reaches the vicinity of the threshold voltage $V_{TH}$ of the MOSFET, the MOSFET becomes a weak ON state, and a voltage $V_{DS}$ between the drain and the source starts to fall. At this time, due to the mirror effect caused by the feedback capacitor C1, the gate receives feedback from the drain, and the speed of the falling of the voltage $V_{DS}$ between the drain and the source decreases, and the gate voltage $V_{GS}$ is maintained in the vicinity of the threshold voltage $V_{TH}$ and then rises very gradually. If the voltage $V_{DS}$ between the drain and the source falls to an operation stabilization point, the gate does not receive feedback from the drain, and the gate voltage $V_{GS}$ starts to rise with the original time constant. A section in which the gate voltage $V_{GS}$ changes gradually is referred to as a mirror period Tm.

A drain current $I_{M1}$ flowing in the bypass transistor M1 is a function of the voltage $V_{GS}$ between the gate and the source and the voltage $V_{DS}$ between the drain and the source. Therefore, if the gate voltage $V_{GS}$ between the gate and the source and the voltage $V_{DS}$ between the drain and the source change gradually, the drain current $I_{M1}$ also increases gradually. As a result, the current $I_{LED}$ flowing in the light emitting unit 12 decreases gradually.

If the control signal S1 transitions to the high level at a time t1, the input transistor Q1 is turned off, and the gate voltage $V_{GS}$ starts to fall. Thereafter, at the same time when the bypass transistor M1 is turned on, the bypass transistor M1 is gradually turned off by the mirror effect, and as a result, the current $I_{LED}$ flowing in the light emitting unit 12 increases gradually.

In the above, the operation of the bypass circuit 40 has been described.

According to the bypass circuit 40, since the feedback capacitor C1 is provided between the gate and the drain of the bypass transistor M1, in the mirror section Tm, the voltage $V_{DS}$ between the drain and the source changes gradually, and the voltage $V_{GS}$ between the gate and the source becomes flat in the vicinity of the threshold voltage $V_{TH}$ and then changes with a small slope. Therefore, it is possible to gradually switch the bypass transistor M1 between the ON state and the OFF state, and it is possible to make the current $I_{LED}$ flowing in the light emitting unit 12 transition gradually.

Also, the gate drive circuit 60 is configured such that a time constant of the path for charging the gate capacitance of the bypass transistor M1 is substantially the same as a time constant of the path for a discharging the gate capacitance. Therefore, it is possible to match delays of the turning-on operation and the turning-off operation, and the slope of the current $I_{LED}$.

Also, the zener voltage of the Zener diode ZD1 which is a clamp element is included in a range of 1.5 times to 3 times of the threshold voltage $V_{TH}$ of the MOSFET. Therefore, the high-level voltage $V_H$ of the drive voltage $V_{GS}$ becomes almost the same as the threshold voltage $V_{TH}$, and thus it is possible to match the turning-on time and the turning-off time.

According to the bypass circuit 40, the turning-on time and the turning-off time can be adjusted according to the time constants of the paths for charging and discharging for the gate capacitance, that is, the impedance $Z_{D1}$ of the diode D1 and the resistors R1, Rd1, and Rd2. If the turning-on time and the turning-off time are excessively short, the effect of suppressing overshooting and undershooting is reduced. On the contrary, if the turning-on time and the turning-off time are excessively long, the loss of the bypass transistor M1 increases. Therefore, it may be preferable to set the turning-on time and the turning-off time to be short within a range in which it is possible to suppress overshooting and undershooting.

Figure 6:
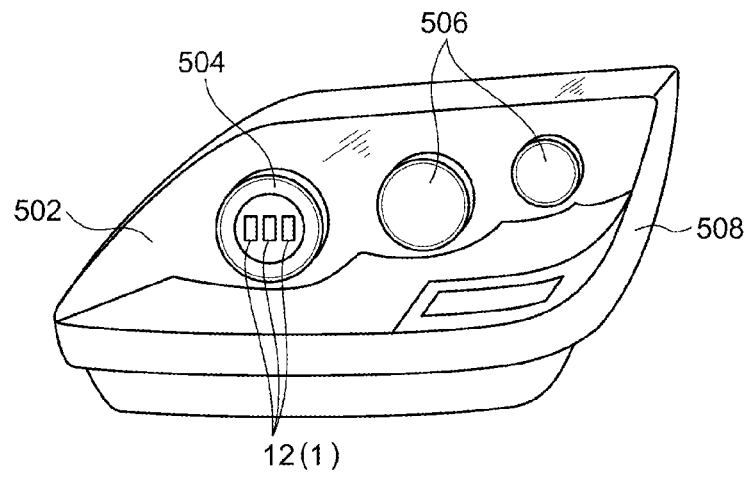
FIG. 6 is a perspective view illustrating a lamp unit including the vehicle lamp according to the first illustrative embodiment.

Subsequently, an application of the vehicle lamp 1 will be described. FIG. 6 is a perspective view illustrating a lamp unit (lamp assembly) 500 having the vehicle lamp 1 according to the first illustrative embodiment. The lamp unit 500 includes a transparent cover 502, a high beam unit 504, low beam units 506, and a case 508. The above described vehicle lamp 1 can be used, for example, in the high beam unit 504. The plurality of light emitting units 12 are disposed in a line, for example, in a horizontal direction, so as to irradiate different areas. When the vehicle is running, areas to be irradiated are adaptively selected by a vehicle-side controller, for example, an electronic control unit (ECU). The vehicle lamp 1 receives data indicating the areas to be irradiated, and turns on the light source 10 (light emitting units 12) corresponding to the indicated areas.

In the above, an aspect of the present invention has been described with reference to the first illustrative embodiment. The present embodiment is illustrative, and it can be understood by those skilled in the art that various modifications can be made by combinations of the components and the processes, and those modifications are also within the scope of the present invention. Hereinafter, such modifications will be described.

First Modification

Figure 7:
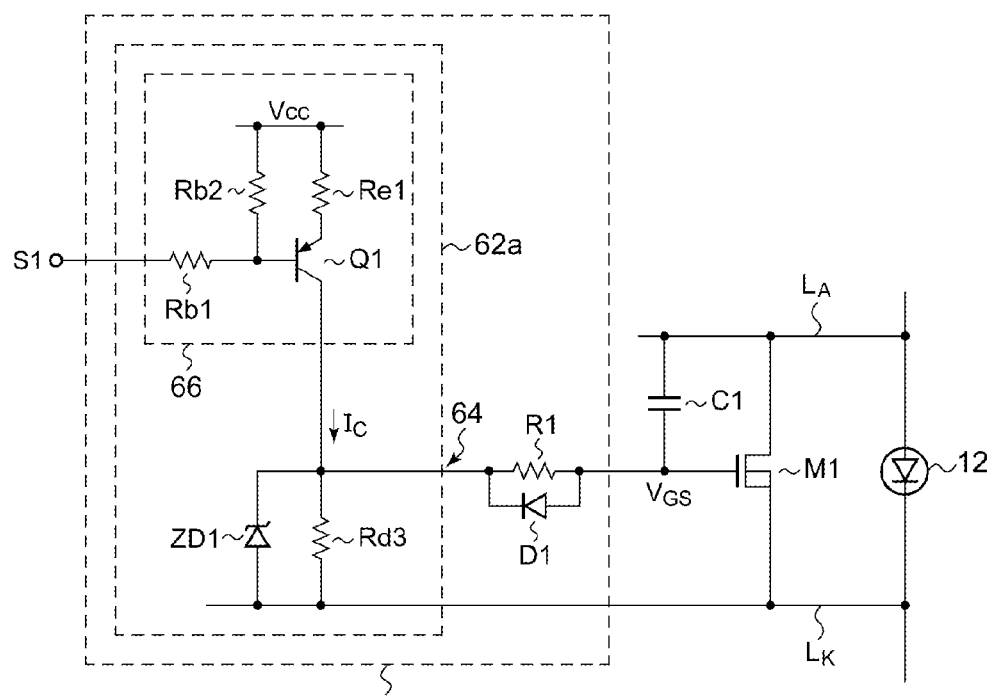
FIG. 7 is a circuit diagram illustrating a bypass circuit according to a first modification.

FIG. 7 is a circuit diagram illustrating a bypass circuit 40a according to a first modification. The bypass circuit 40a is different from that of FIG. 4 in the configuration of a level shift circuit 62a. The level shift circuit 62a includes a constant current source 66, a resistor Rd3 for conversion between current and voltage, and a Zener diode ZD1. The constant current source 66 can switch between an ON state and an OFF state in response to the control signal S1, and generates a constant current Ic when it is in the ON state. The configuration of the constant current source 66 is not especially limited, and it is possible to easily configure a simple constant current source, for example, by connecting a resistor Re1 to the emitter of the input transistor Q1. If the base voltage of the input transistor Q1 when the control signal S1 is at the low level is denoted by $V_{BL}$, the constant current Ic is expressed by Expression (12).

$$Ic = \{V_{CC} - (V_{BL} + V_{BE})\}/Re1 \quad (12)$$

Here, $V_{BE}$ represents the voltage between the base and the emitter of the input transistor Q1, and is a constant of about 0.6 V.

The resistor Rd3 is provided on the path of the constant current Ic. The voltage drop (Rd3×Ic) of the resistor Rd3 is output as the drive voltage $V_{GS}$ from the output terminal 64. The Zener diode ZD1 clamps the drive voltage $V_{GS}$ such that the drive voltage $V_{GS}$ does not exceed the clamp voltage $V_{CL}$. Also, in the first modification, it may be preferable to determine a circuit constant so as to satisfy the Expression: $V_{CL} < Rd3 \times Ic$.

According to the first modification, it may be possible to achieve the same effects as those of the above illustrative embodiment.

Second Modification

As the light source 10, besides LEDs, semiconductor light sources such as laser diodes (LDs) and organic electroluminescent (EL) elements can be used.

Third Modification

Figure 3:
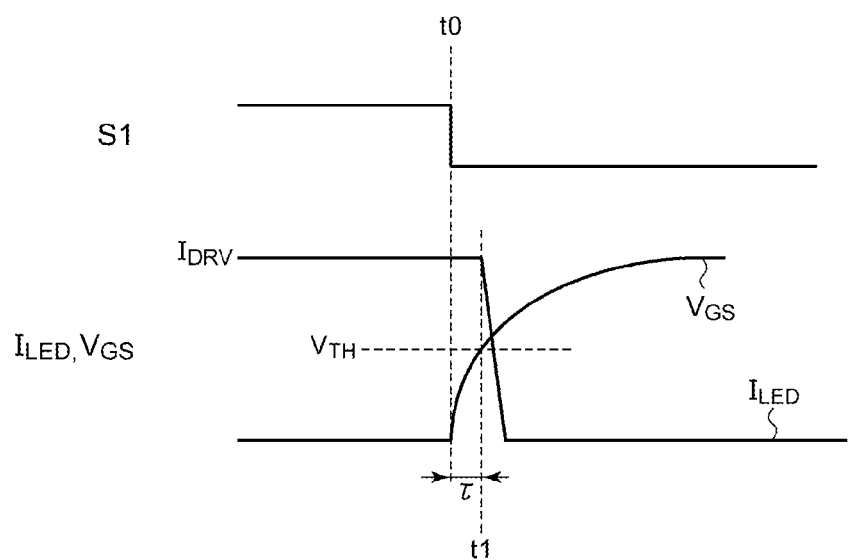
FIG. 3 is a waveform chart illustrating an operation of a vehicle lamp having the bypass circuit of FIG. 2.

In the lamp unit 500 of FIG. 6, a case of using the vehicle lamp 1 shown in FIG. 3 in the high beam unit 504 has been described. However, alternatively or additionally, the vehicle lamp 1 may be used in the low beam units 506.

Second Illustrative Embodiment

Figure 8:
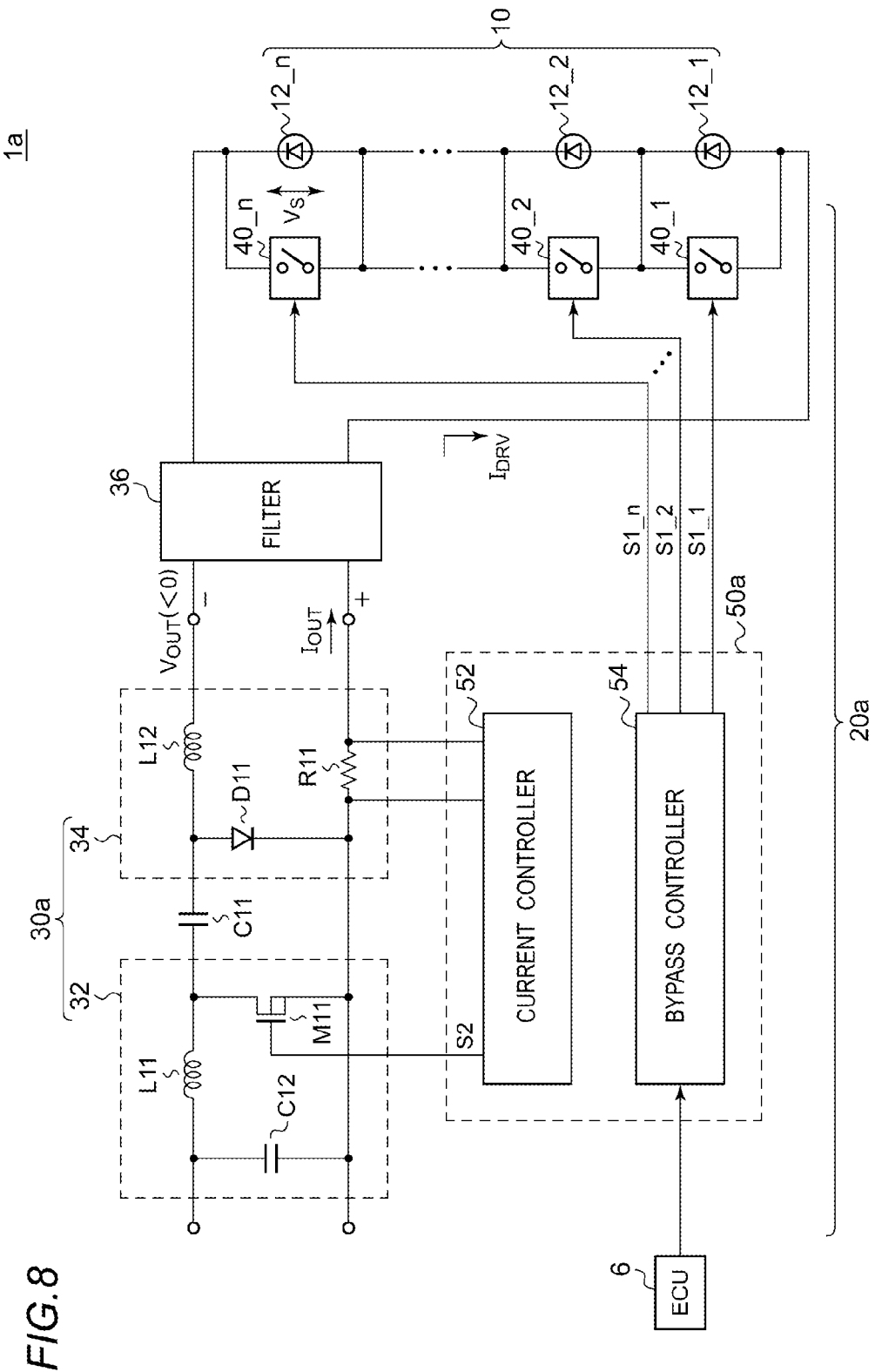
FIG. 8 is a block diagram illustrating a vehicle lamp according to a second illustrative embodiment.

FIG. 8 is a block diagram illustrating a vehicle lamp according to a second illustrative embodiment.

The vehicle lamp 1 includes a light source 10 and a driving device 20a. The light source 10 includes a plurality of light emitting units 12_1 to 12_N which are associated with N sub-areas.

The driving device 20a includes a converter 30a, a filter 36, N bypass circuits 40_1 to 40_N, and a controller 50a. The configurations of the bypass circuits 40 are not especially limited, and the bypass circuits 40 may be configured as shown in FIG. 4 or 7.

A portion of the converter 30a and the controller 50a corresponds to the current source 30 of the first illustrative embodiment. The converter 30a supplies a drive current $I_{DRV}$ to the light source 10. The controller 50a includes a current controller 52 and a bypass controller 54. The current controller 52 generates a pulse signal S2 so as to control the converter 30a such that the drive current $I_{DRV}$ approaches a predetermined target value $I_{REF}$. The bypass controller 54 controls turning on and off of each of the N bypass circuits 40_1 to 40_N.

The filter 36 is provided between the converter 30a and the light source 10. The filter 36 removes a ripple component or a noise component of an output current $I_{OUT}$, and supplies the drive current $I_{DRV}$ to the light source 10.

The configuration of the converter 30a will be described. The converter 30a is a Cuk converter, and includes a switching transistor M11, a first inductor L11, a second inductor L12, a coupling capacitor C11, an input capacitor C12, and a detection resistor R11. The input capacitor C12 may be omitted. The first inductor L11 may include a first magnetic element or may be a transformer, and the second inductor L12 may include a second magnetic element or may be a transformer. The detection resistor R11 is provided on a path for flowing a current $I_{OUT}$ which is generated by the converter 30a, and causes a voltage drop proportional to the current $I_{OUT}$. The current controller 52 detects the current $I_{OUT}$ (that is, the drive current $I_{DRV}$) based on the voltage drop of the detection resistor R11, and controls the bypass transistor M1. It is noted that, in the Cuk converter, an output voltage $V_{OUT}$ becomes negative.

The input capacitor C12, the switching transistor M11, and the first inductor L11 configure a primary side circuit 32. A diode D11 and the second inductor L12 configure a secondary side circuit 34. The inductance of the second inductor L12 is denoted by $L_S$. The primary side circuit 32 and the secondary side circuit 34 are coupled through the coupling capacitor C11 having a capacitance value C.

The first inductor L11 accumulates energy when the switching transistor M11 is on, and releases the energy when the switching transistor M11 is off. The released energy is transmitted to the secondary side circuit 34 through the coupling capacitor C11. This energy (current) is rectified by the diode D11 and the second inductor L12. The speed of increasing or decreasing of the output current $I_{OUT}$ of the converter 30a is determined according to the inductance $L_S$ of the second inductor L12.

If a difference of the output voltage between before and after the bypass circuit 40 is turn on or off is denoted by $\Delta V$, a transition time $T_{TRN}$ which is required to turn on or off the bypass circuit 40 is determined so as to satisfy Expression (1).

$$\Delta V \times C < I_{REF} \times T_{TRN} \quad (1)$$

If the number of bypass circuits 40 to be turned on at the same time is denoted by $n_{ON}$, and the number of bypass circuits 40 to be turned off at the same time is denoted by $n_{OFF}$, the output voltage difference $\Delta V$ is obtained by the following Expression: $\Delta V = |(n_{ON} - n_{OFF})| \times Vf$. That is, the output voltage difference $\Delta V$ depends on the number of bypass circuits 40 to be controlled at the same time. If the maximum value which the output voltage difference $\Delta V$ can take is denoted by $\Delta V_{MAX}$, the following relational expression (1a) is obtained.

$$\Delta V_{MAX} \times C / I_{REF} < T_{TRN} \quad (1a)$$

It is assumed that at most k bypass circuits out of n bypass circuits 40 can be switched between the ON state and the OFF state at the same time. In this case, when the k bypass circuits 40 transition from the ON state to the OFF state, or from the OFF state to the ON state, the output voltage difference $\Delta V$ takes the maximum value. Therefore, the maximum value $\Delta V_{MAX}$ of the output voltage difference $\Delta V$ is obtained based on the forward voltage Vf which is obtained when the drive current $I_{DRV}$ flows in a light emitting unit 12, by the following expression: $\Delta V_{MAX} = k \times Vf$.

Also, as will be described below, since Expression (1) is a condition for protecting the light emitting units 12, in a case where all of the n bypass circuits 40 can be switched between the ON state and the OFF state at the same time, it becomes unnecessary to protect the light emitting units 12, and thus Expression (1) becomes useless. Therefore, in this case, the maximum value $\Delta V_{MAX}$ may be obtained by the following expression: $\Delta V_{MAX} = (n-1) \times Vf$.

For example, in a case where the maximum value $\Delta V_{MAX}$ is 50 V, the capacitance C of the coupling capacitor C11 is 1.0 µF, and the predetermined target value $I_{REF}$ is 1.0 A, it may be preferable to set the transition time $T_{TRN}$ longer than 50 µs.

Also, an overcurrent suppressing effect (to be described below) may be more effective as the capacitance C of the coupling capacitor C11 decreases, and as the transition time $T_{TRN}$ becomes longer. However, if the capacitance C is excessively small, it becomes easy for the converter 30a to oscillate, and an amount of energy transmission from the primary side circuit 32 to the secondary side circuit 34 decreases, and thus the output power of the converter 30a decreases. Also, if the transition time $T_{TRN}$ is set to be excessively long, the power loss of the bypass circuits 40 increases, and a delay occurs in PWM dimming, and the accuracy of dimming decreases. Therefore, it may be preferable to determine the transition time $T_{TRN}$ so as to satisfy Expression (1), in view of efficiency and resistance to oscillation.

Also, if a rated maximum current of the light emitting units 12 is denoted by $I_{MAX}$, a switching cycle of the switching transistor M11 is denoted by $T_{SW}$, and an inductance of the second inductor L12 is denoted by $L_S$, the converter 30a is configured so as to satisfy the following Expression (2).

$$I_{REF} \times \Delta V \times T_{SW}^2 / T_{TRN} < L_S \times (I_{MAX}^2 - I_{REF}^2)/2 \quad (2)$$

Figure 9:
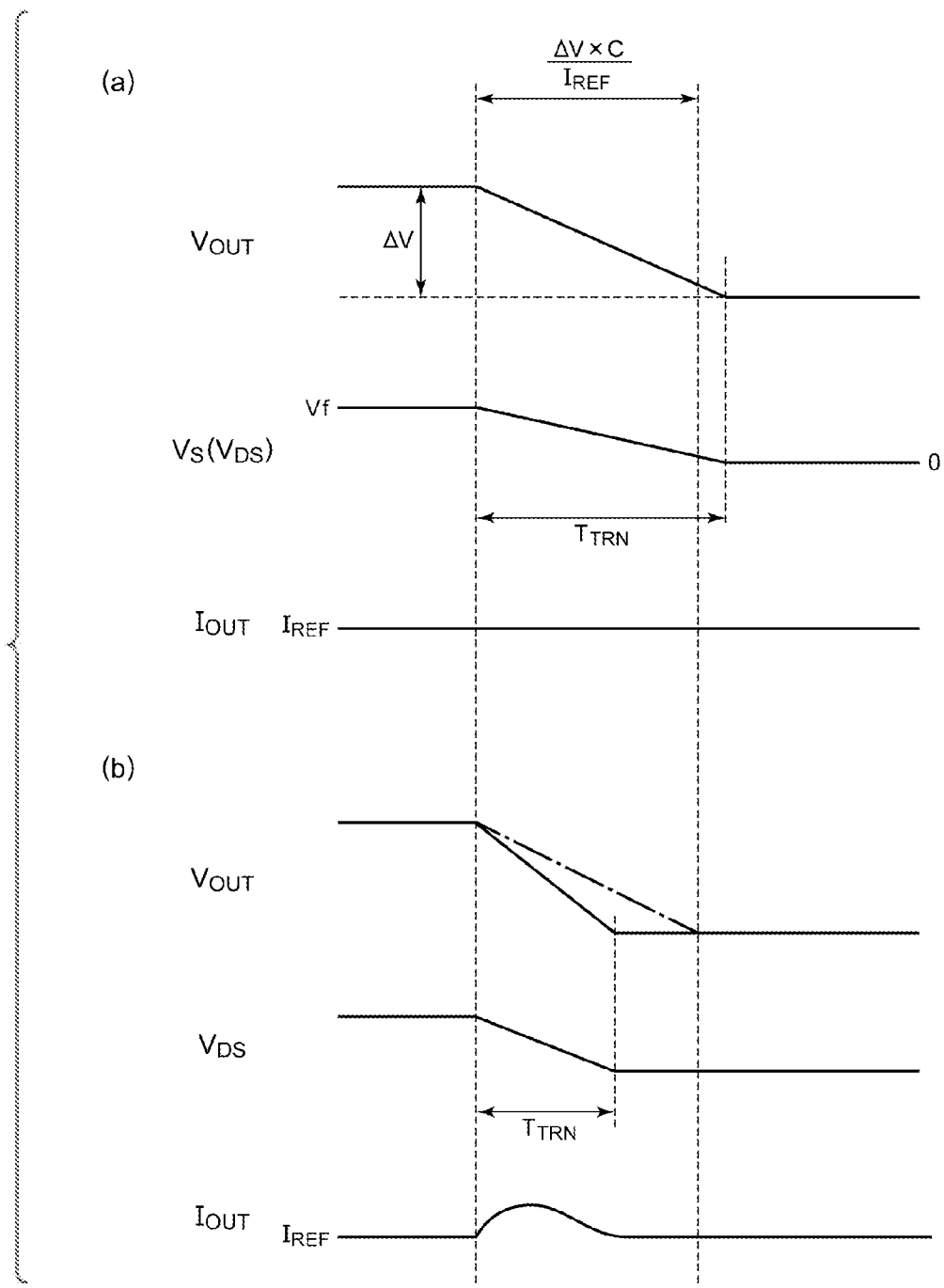
FIG. 9 is a waveform chart illustrating a turning-on operation of the bypass circuit.

In the above, the configuration of the vehicle lamp 1a according to the second illustrative embodiment has been described. Subsequently, the operation of the vehicle lamp 1a will be described. FIG. 9 is a waveform chart illustrating a turning-on operation of the bypass circuit 40. In FIG. 9, (a) shows a case where Expression (1) is satisfied, and (b) shows a case where Expression (1) is not satisfied.

In the Cuk converter, the voltage between both ends of the coupling capacitor C11 becomes the output voltage $V_{OUT}$. Therefore, in order to change the output voltage $V_{OUT}$ by $\Delta V$, it is necessary to charge or discharge the coupling capacitor C11 by $\Delta V \times C$. Since the change speed of $\Delta V$ is the transition time $T_{TRN}$ of each bypass circuit 40, if the output voltage $V_{OUT}$ changes by $\Delta V$ in the transition time $T_{TRN}$, the charging/discharging current $I_{ouT}$ of the coupling capacitor C11 is expressed as follows.

$$I_{OUT} = \Delta V \times C / T_{TRN}$$

If the current $I_{OUT}$ exceeds the predetermined target value $I_{REF}$, the current $I_{LED}$ exceeding the predetermined target value $I_{REF}$ flows in the light source 10, and thus the light source 10 becomes an overcurrent state. Therefore, as shown in (b) of FIG. 9, as the bypass circuit 40 is turned off at high speed according to the transition time $T_{TRN}$ which does not satisfy Expression (1), the output current $I_{OUT}$ overshoots, and an overcurrent flows in the light emitting unit 12.

In contrast, if the capacitance C of the coupling capacitor C11 and the transition time $T_{TRN}$ are determined so as to satisfy Expression (1), even if the voltage between both ends of the coupling capacitor C11 is changed by $\Delta V$, the current $I_{OUT}$ does not exceed the target value $I_{REF}$. Therefore, it is possible to suppress overshooting of the output current $I_{OUT}$, and it is possible to prevent an overcurrent from flowing in the light emitting units 12.

Figure 10:
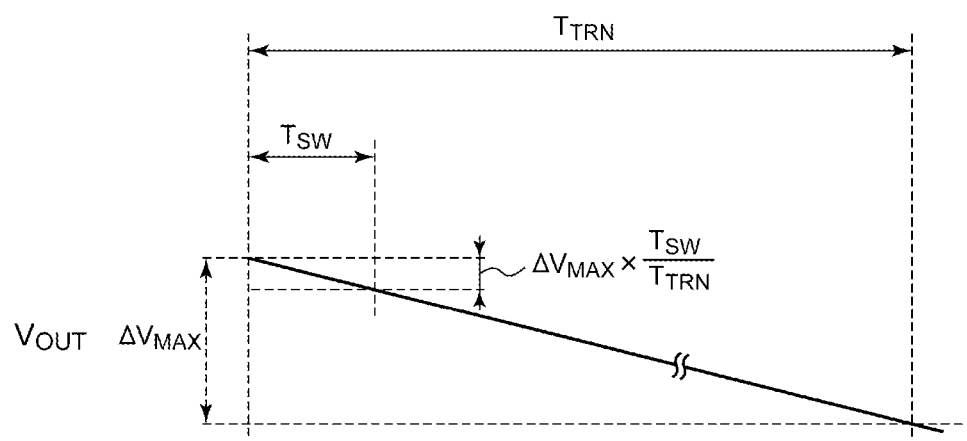
FIG. 10 is a waveform chart illustrating a switching operation of a switching transistor.

FIG. 10 is a waveform chart illustrating a switching operation of the switching transistor M11. The current change according to the transition time $T_{TRN}$ of the bypass circuit 40 shown in FIG. 9 is performed in a time scale of several tens µs, whereas the current change according to switching the bypass transistor M1 to be described below is performed in a time scale as short as several µs.

It is assumed that when the output current $I_{OUT}$ of the converter 30a has been stable at the target value $I_{REF}$, according to control of the bypass circuit 40, the output voltage $V_{OUT}$ has decreased by $\Delta V_{MAX}$ over the transition time $T_{TRN}$. In this case, after switching of the bypass circuit 40, in the primary side circuit 32 of the converter 30a, excess energy according to $\Delta V_{MAX} \times I_{REF}$ is generated.

In a case where the current controller 52 performs hysteresis control on the current $I_{OUT}$, if the output current $I_{OUT}$ exceeds the target value $I_{REF}$, switching stops. Therefore, the maximum period for which energy can be accumulated is one switching cycle $T_{SW}$. In this switching cycle $T_{SW}$, the output voltage $V_{OUT}$ changes by $\Delta V' = \Delta V_{MAX} \times T_{SW} / T_{TRN}$. That is, excessive energy $W_{Ex}$ is given by the following Expression (3).

$$W_{EX} = I_{REF} \times \Delta V' \times T_{SW} = I_{REF} \times \Delta V_{MAX} \times T_{SW}^2 / T_{TRN} \quad (3)$$

The excessive energy $W_{Ex}$ is transmitted from the primary side circuit 32 to the secondary side circuit 34, and causes the output current $I_{OUT}$ to increase. At this time, if the output current $I_{OUT}$ increases from $I_{REF}$ to $I_{PEAK}$, Expression (4) is established from the law of conservation of energy.

$$W_{EX} = L_S \times (I_{PEAK}^2 - I_{REF}^2)/2 \quad (4)$$

In order to secure the reliability of the light emitting units 12, the amount $I_{PEAK}$ of increased current needs only to be smaller than the rated maximum current $I_{MAX}$ of the light emitting units 12.

Therefore, if Expression (5) is satisfied, it can be secured that the output current $I_{OUT}$ is smaller than the rated maximum current of the light emitting units 12.

$$W_{EX} < L_S \times (I_{MAX}^2 - I_{REF}^2)/2 \quad (5)$$

If Expression (3) is substituted in Expression (5), Expression (2) is obtained.

$$I_{REF} \times \Delta V_{MAX} \times T_{SW}^2 / T_{TRN}^2 / T_{TRN} < L_S \times (I_{MAX}^2 - I_{REF}^2)/2 \quad (2)$$

That is, it is possible to protect the light emitting units 12 by designing the circuit so as to satisfy Expression (2).

For example, in a case where $\Delta V_{MAX}$ is 50 V, $I_{REF}$ is 1.0 A, $T_{SW}$ is 4 μs, $T_{TRN}$ is 100 μs, and $I_{MAX}$ is 1.2 A, the inductance $L_S$ needs only to be larger than 29 μH.

Also, as the inductance $L_S$ of the second inductor L12 increases, it is possible to suppress an overcurrent or a noise component; however, the inductor becomes bigger, and the component cost also increases. Therefore, in terms of the size and the cost, it may be preferable to set the inductance $L_S$ of the second inductor L12 to be smaller in a range in which Expression (2) is satisfied. Here, in a case where the filter 36 includes an inductor, change of the output current $I_{OUT}$ is suppressed by the combined inductance of the second inductor L12 and the inductor of the filter. Therefore, the inductance of the second inductor L12 can be set to a value which is obtained by subtracting the inductance of the filter 36 from the value determined from Expression (2).

In the above, an aspect of the present invention has been described with reference to the first illustrative embodiment. The present embodiment is illustrative, and it can be understood by those skilled in the art that various modifications can be made by combinations of the components and the processes, and those modifications are also within the scope of the present invention. Hereinafter, such modifications will be described.

Fourth Modification

In the second illustrative embodiment, the Cuk converter has been described as an example. However, the present invention is not limited thereto. The converter 30a needs only to have a topology which has the primary side circuit 32 including the first inductor L11 and the switching transistor M11, the secondary side circuit 34 including the second inductor L12, and the coupling capacitor C11 configured to couple the primary side circuit 32 and the secondary side circuit 34. As such converter 30a, a Zeta converter or the like are known.

Description has been made regarding the present invention with reference to the illustrative embodiments using specific terms. However, the above-described illustrative embodiments show only the mechanisms and applications of the present invention for exemplary purposes only and are by no means intended to be interpreted restrictively. Rather, various modifications and various changes in the layout can be made without departing from the spirit and scope of the present invention defined in appended claims.

What is claimed is:

1. A driving device which is used together with a light source including a plurality of light emitting units connected in series to configure a vehicle lamp, the driving device comprising:
   a current source which is configured to supply a drive current to the light source; and
   N bypass circuits which are associated with N light emitting units of the plurality of light emitting units and provided in parallel to the N light emitting units, respectively, and which are configured to be independently switchable between an ON state and an OFF state, where N is a natural number,
   wherein each of the bypass circuits includes:
      a bypass transistor which is provided in parallel to a corresponding light emitting unit;
      a feedback capacitor which is provided between a gate and a drain of the bypass transistor or between a gate and a collector of the bypass transistor; and
      a gate drive circuit which is configured to supply a drive voltage between the gate and a source of the bypass transistor or between the gate and an emitter of the bypass transistor, according to a control signal.

2. The driving device according to claim 1,
   wherein the gate drive circuit is configured such that a time constant of charging and a time constant of discharging for a gate capacitance of the bypass transistor and the feedback capacitor are substantially same.

3. The driving device according to claim 1,
   wherein the gate drive circuit includes:
      a clamp element which is configured to limit a voltage between the gate and the source of the bypass transistor or between the gate and the emitter of the bypass transistor such that the voltage does not exceed a predetermined clamp voltage, and
   wherein the clamp voltage is 1.5 times to 3 times of a threshold voltage of the bypass transistor.

4. A vehicle lamp comprising:
   a light source which includes a plurality of light emitting units connected in series; and
   the driving device according to claim 1 which is configured to drive the light source.

5. The driving device according to claim 1, wherein
   the feedback capacitor has a capacitance configured to provide a mirror effect to the bypass transistor.

6. The driving device according to claim 1,
   wherein the gate drive circuit includes:
      a level shift circuit which is configured to receive the control signal and generate a drive voltage such that the drive voltage transitions between a high-level voltage $V_H$ and 0 V;
      a current limiting resistor which includes one end connected to the gate of the bypass transistor and another end connected to an output terminal of the level shift circuit; and
      a diode which is provided in parallel to the current limiting resistor such that an anode of the diode is positioned on a gate side of the bypass transistor.

7. The driving device according to claim 6,
   wherein the level shift circuit includes:
      an input transistor which is configured to be turned on or off according to the control signal; and
      a voltage dividing resistor pair which includes two resistors connected in series and is configured to divide a voltage of one end of the input transistor.

8. The driving device according to claim 6,
   wherein the level shift circuit includes:
      a constant current source which is configured to be turned on or off according to the control signal; and
      a resistor which is configured to make conversion between current and voltage and is provided on a path for flowing a current which is generated by the constant current source.

9. A driving device which is used together with a light source including a plurality of light emitting units connected in series to configure a vehicle lamp, the driving device comprising:
   a converter which is configured to supply a drive current to the light source;
   N bypass circuits which are associated with N light emitting units of the plurality of light emitting units and provided in parallel to the N light emitting units, respectively, and which are configured to be independently switchable between an ON state and an OFF state, where N is a natural number; and a controller which is configured to control the converter such that the drive current approaches a predetermined target value $I_{REF}$ and control turning on and off of the N bypass circuits, wherein the converter includes:

a primary side circuit which includes a switching transistor, and a first inductor configured to accumulate energy at switching of the switching transistor;

a secondary side circuit which includes a second inductor; and a coupling capacitor which includes capacitance C and is configured to couple the primary side circuit and the secondary side circuit, and wherein a transition time $T_{TRN}$ which is required to turn on or off the bypass circuit satisfies the following expression:

$$\Delta V \times C < I_{REF} \times T_{TRN}$$

where $\Delta V$ is a difference of an output voltage of the converter between before and after the bypass circuit is turn on or off.

10. The driving device according to claim 9, wherein the following expression is satisfied:

$$I_{REF} \times \Delta V \times T_{SW}^2 / T_{TRN} < L \times (I_{MAX}^2 - I_{REF}^2)/2$$

where L is an inductance of the second inductor, $I_{MAX}$ is a rated maximum current of the light emitting units, and $T_{SW}$ is a switching cycle of the switching transistor.

11. The driving device according to claim 9, wherein each of the bypass circuits includes:

a bypass transistor which is provided in parallel to a corresponding light emitting unit;

a feedback capacitor which is provided between a gate and a drain of the bypass transistor or between a gate and a collector of the bypass transistor; and a gate drive circuit which is configured to supply a drive voltage between the gate and a source of the bypass transistor or between the gate and an emitter of the bypass transistor, according to a control signal.

12. A vehicle lamp comprising:

a light source which includes a plurality of light emitting units connected in series; and the driving device according to claim 9 which is configured to drive the light source.

13. A driving device which is used together with a light source including a plurality of light emitting units connected in series to configure a vehicle lamp, the driving device comprising:

a converter which is configured to supply a drive current to the light source;

N bypass circuits which are associated with N light emitting units of the plurality of light emitting units and provided in parallel to the N light emitting units, respectively, and which are configured to be independently switchable between an ON state and an OFF state, where N is a natural number; and a controller which is configured to control the converter such that the drive current approaches a predetermined target value $I_{REF}$ and control turning on and off of the N bypass circuits, wherein the converter includes:

a primary side circuit which includes a switching transistor, and a first inductor configured to accumulate energy at switching of the switching transistor;

a secondary side circuit which includes a second inductor having an inductance L; and a coupling capacitor which is configured to couple the primary side circuit and the secondary side circuit, and wherein the following expression is satisfied:

$$I_{REF} \times \Delta V \times T_{SW}^2 / T_{TRN} < L \times (I_{MAX}^2 - I_{REF}^2)/2$$

where $T_{TRN}$ is a transition time which is required to turn on or off the bypass circuit, $\Delta V$ is a difference of an output voltage of the converter between before and after the bypass circuit is turn on or off, $I_{MAX}$ is a rated maximum current of the light emitting units, and $T_{SW}$ is a switching cycle of the switching transistor.

14. The driving device according to claim 13, wherein each of the bypass circuits includes:

a bypass transistor which is provided in parallel to a corresponding light emitting unit;

a feedback capacitor which is provided between a gate and a drain of the bypass transistor or between a gate and a collector of the bypass transistor; and a gate drive circuit which is configured to supply a drive voltage between the gate and a source of the bypass transistor or between the gate and an emitter of the bypass transistor, according to a control signal.

15. A vehicle lamp comprising:

a light source which includes a plurality of light emitting units connected in series; and the driving device according to claim 13 which is configured to drive the light source.

* * * * *